(12) United States Patent
Beyme

(10) Patent No.: US 9,686,702 B2
(45) Date of Patent: Jun. 20, 2017

(54) CHANNEL EMULATION FOR TESTING NETWORK RESOURCES

(71) Applicant: Viavi Solutions Inc., Milpitas, CA (US)

(72) Inventor: Steffen Beyme, Vancouver (CA)

(73) Assignee: Viavi Solutions Inc., Milpitas, CA (US)

( * ) Notice: Subject to any disclaimer, the term of this patent is extended or adjusted under 35 U.S.C. 154(b) by 120 days.

(21) Appl. No.: 14/792,152

(22) Filed: Jul. 6, 2015

(65) Prior Publication Data

US 2017/0013486 A1    Jan. 12, 2017

(51) Int. Cl.
| | |
|---|---|
| *H04L 12/50* | (2006.01) |
| *H04W 24/08* | (2009.01) |
| *H04B 17/00* | (2015.01) |
| *H04B 17/391* | (2015.01) |
| *H04W 72/08* | (2009.01) |

(52) U.S. Cl.
CPC ........ *H04W 24/08* (2013.01); *H04B 17/0085* (2013.01); *H04B 17/0087* (2013.01); *H04B 17/3911* (2015.01); *H04B 17/3912* (2015.01); *H04W 72/085* (2013.01)

(58) Field of Classification Search
CPC ........................... H04W 24/08; H04B 17/0085
USPC ....................................................... 370/401
See application file for complete search history.

(56) References Cited

U.S. PATENT DOCUMENTS

| | | | |
|---|---|---|---|
| 7,286,802 B2 | 10/2007 | Beyme et al. | |
| 2009/0310491 A1* | 12/2009 | Ginsberg | ............ H04L 12/2697 370/241 |

FOREIGN PATENT DOCUMENTS

| | | |
|---|---|---|
| EP | 11425130.9 | 5/2011 |
| EP | 2330843 | 6/2011 |
| GB | 2440165 | 1/2008 |
| WO | 2014/106561 | 7/2014 |

OTHER PUBLICATIONS

European Search Report corresponding to EP 16 17 7773 mailed Oct. 28, 2016, 9 pages.
Bello, "Characterization of Randomly Time-Variant Linear Channels," Institute of Electrical and Electronics Engineers, Communications Systems, vol. 11, Issue 4, Dec. 1963, 34 pages.
Dent, "Jakes Fading Model Revisited," Electronics Letters, vol. 29, No. 13, Jun. 24, 1993, 2 pages.

(Continued)

*Primary Examiner* — Dang Ton
(74) *Attorney, Agent, or Firm* — Harrity & Harrity, LLP

(57) ABSTRACT

A device receives fading channel conditions to utilize for simulating behavior of multiple mobile devices in a mobile network, and at least one of the fading channel conditions for at least one of the multiple mobile devices is different than at least another one of the fading channel conditions for at least another one of the multiple mobile devices. The device generates channel realizations based on the fading channel conditions, and the channel realizations include time-discrete and frequency-discrete random channel coefficients. The device generates a test channel based on the generated channel realizations, and provides the test channel to a receiver device of the mobile network. The test channel causes the receiver device to perform functions associated with processing an actual channel.

20 Claims, 10 Drawing Sheets

(56) References Cited

OTHER PUBLICATIONS

Jakes, "Microwave Mobile Communications," Institute of Electrical and Electronics Engineers, Inc., 1974, 645 pages.
Chiavaccini, "Error Performance of OFDM Signaling Over Doubly-Selective Rayleigh Fading Channels," Institute of Electrical and Electronics Engineers Communications on Letters, vol. 4, No. 11, Nov. 2000, 3 pages.

* cited by examiner

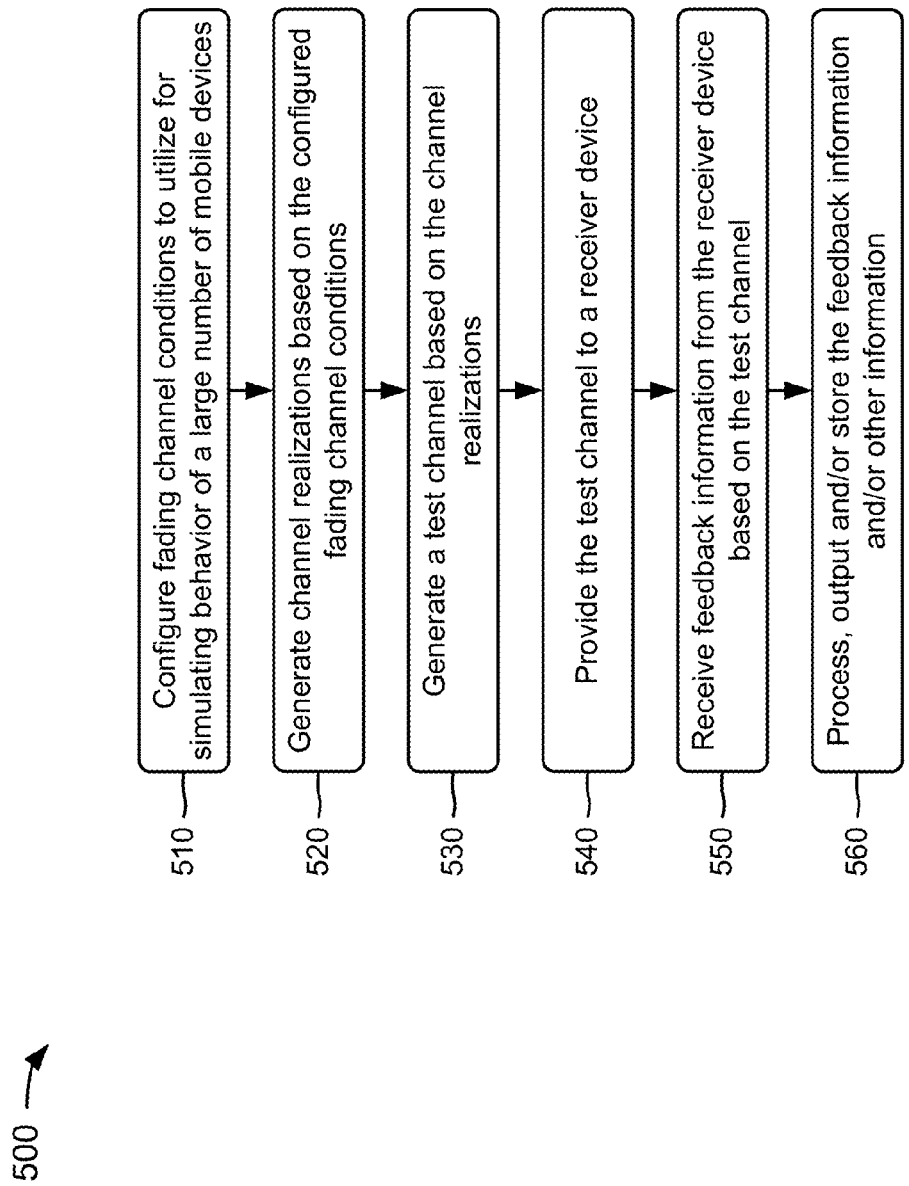

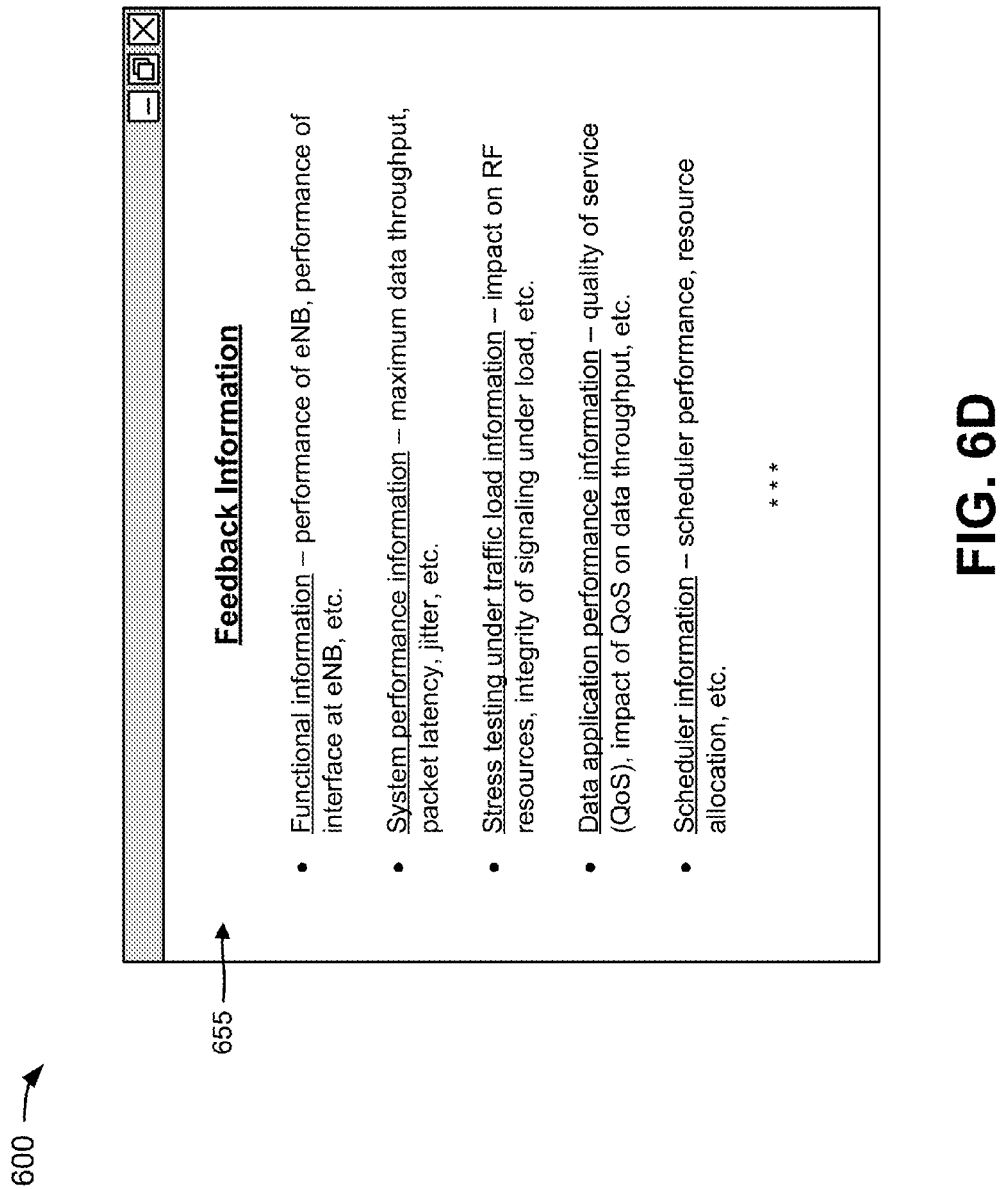

CHANNEL EMULATION FOR TESTING NETWORK RESOURCES

BACKGROUND

Fading channel emulation for a large number of mobile devices is a common challenge in testing and characterizing mobile network resources, such as eNodeBs (eNBs) in long term evolution (LTE) or LTE-Advanced networks. It has been demonstrated that comprehensive testing of a mobile network early in a development cycle, under challenging realistic load and radio channel conditions, can prevent shortfalls in key performance indicators or costly outages of the fully deployed network.

In mobile networks, heterogeneous networks, and relay networks, packet-oriented user data transmission has become a default method, even for traditionally circuit-switched modes of communication, such as voice. This is because packet-oriented user data transmission can more readily exploit space, time, and frequency-diverse channel conditions to maximize traffic, subject to fairness and quality-of-service (QoS) criteria. A central responsibility of a mobile network resource (e.g., an eNB) is the dynamic allocation and/or scheduling of transmission resources, such as time, frequency, modulation and coding, power, or the like, and of multi-antenna mode of operation (e.g., spatial multiplex, diversity, beam forming, or the like). Relevant industry standards for mobile networks, such as the Third Generation Partnership Project (3GPP), do not define details of such scheduling algorithms, and, as a result, providers of mobile networks often utilize proprietary scheduling algorithms.

The characteristics and performance of a scheduling algorithm may be studied using analytical and/or simulation methods. However, such methods generally require the introduction of simplifying assumptions, some of which may not, or only approximately, be satisfied in practice. Furthermore, the implementation of a complex communication algorithm may deviate from an ideal model due to unavoidable trade-offs and unintentional defects or idiosyncrasies associated with the particular implementation. Such issues have to be dealt with on a continuous basis since new standards are released and additional communication services, transmission modes, or the like are introduced.

BRIEF DESCRIPTION OF THE DRAWINGS

FIG. 5 is a flow chart of an example process for testing network resources via channel emulation; and FIGS. 6A-6D are diagrams of an example relating to the example process shown in FIG. 5.

DETAILED DESCRIPTION

Figure 1:
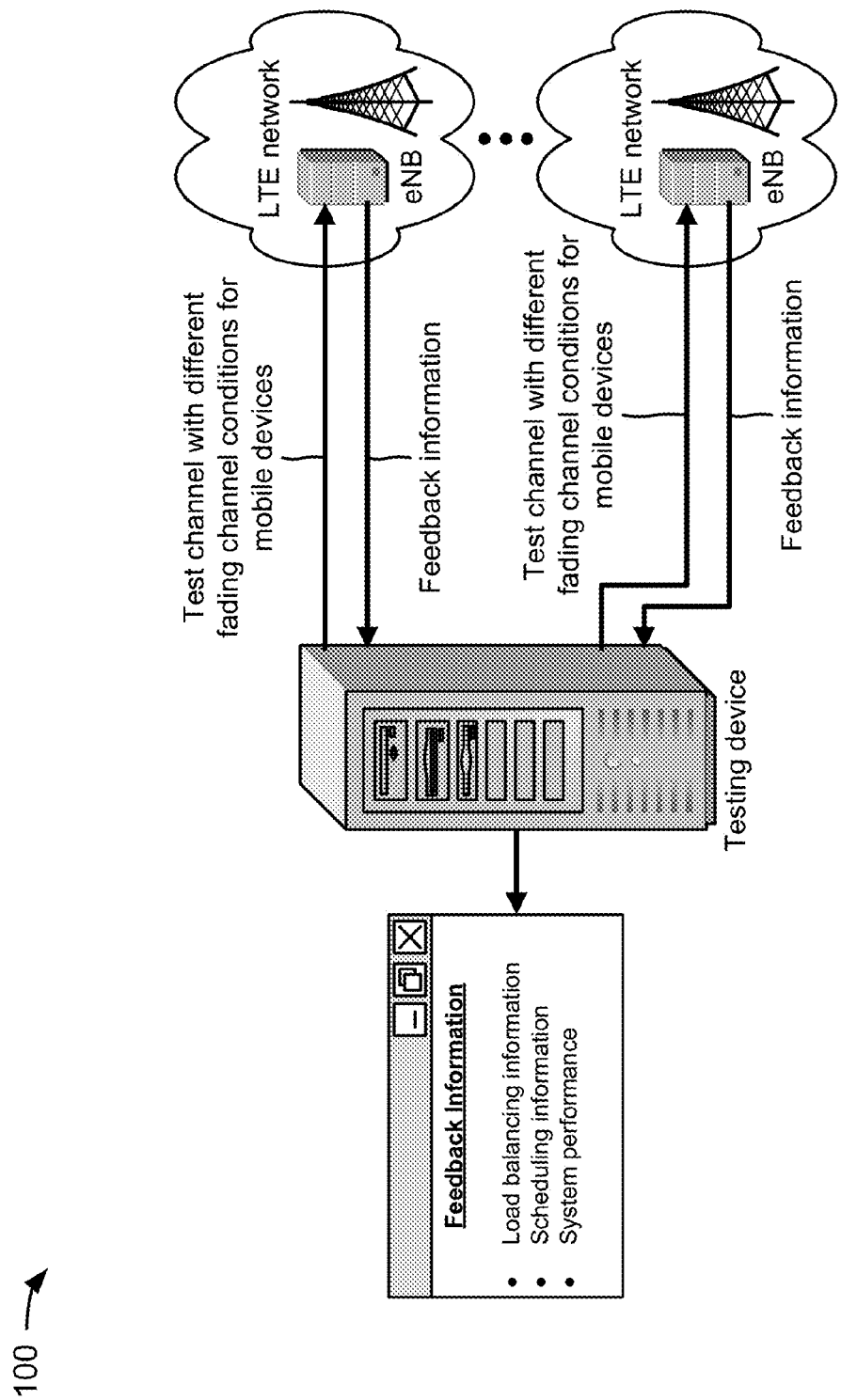
FIG. 1 is a diagram of an overview of an example implementation described herein.

The following detailed description refers to the accompanying drawings. The same reference numbers in different drawings may identify the same or similar elements.

Extensive mobile network testing and characterization under dynamic load and fading channel conditions may be needed to identify any problems early in the development cycle of a mobile network. In wireless communications, fading generally refers to a deviation of attenuation and phase affecting a signal propagating through a radio channel. The fading may vary with time, radio frequency or geographical position. Testing mobile networks may reduce the risks inherent in deploying advanced mobile networks and the continuous introduction of new algorithms, services, or the like. One type of mobile network, a fourth generation (4G) cellular network, includes an evolved packet system (EPS). The EPS may include a radio access network (e.g., referred to as a LTE network), a wireless core network (e.g., referred to as an evolved packet core (EPC) network), an Internet protocol (IP) multimedia subsystem (IMS) network, and a packet data network (PDN). The LTE network is often called an evolved universal terrestrial radio access network (E-UTRAN). The EPC network is an all-IP packet-switched core network that supports high-speed wireless and wireline broadband access technologies. The EPC network allows mobile devices (also called "user equipment (UEs)") to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching.

Channel emulation may be used to test network resources of a 4G cellular network. However, existing channel emulators are unable to simulate a large number of mobile devices, and are generally designed for use with a single or a very small number of mobile devices. While existing channel emulators typically provide comprehensive control over many characteristics of a fading channel, or a limited number of fading channels, the existing channel emulators do not scale well to test scenarios involving tens, hundreds, or thousands of mobile devices.

Existing multi-mobile device test solutions for mobile networks do not readily provide access to the radio or baseband channels associated with the individual mobile devices, which may be necessary to apply fading and other impairments to each mobile device independently. Rather, the existing test solutions aggregate the mobile device signals and provide the aggregated signals to a mobile network resource (e.g., an eNB).

Since baseband processing for multiple mobile devices imposes considerable computational demands, existing large-scale multi-mobile device simulators attempt to jointly process the mobile device signals, rather than replicate processing steps for a single mobile device multiple times. For example, an uplink inverse fast Fourier transform (IFFT) function of existing simulators transforms an orthogonal frequency-division multiplexing (OFDM) sub-carrier domain signal to a time domain signal prior to transmission. Rather than performing the IFFT function for every mobile device individually, with subsequent summation to form an aggregate uplink signal, the linearity of the Fourier transform allows the aggregate signal to be formed in the sub-carrier domain. Thus, only a single instance of the IFFT function is needed to transform the aggregate signal to the time domain. However, such an approach to uplink signal generation in existing simulators prevents the use of time-domain channel emulators based on a tapped-delay line model since individual time-domain signals of the mobile devices are not available.

Systems and/or methods, described herein, may provide a testing device with a radio channel emulator that introduces channel impairments consistent with fading channel conditions to enable testing and optimization of mobile network resources and infrastructure. In some implementations, the radio channel emulator may provide test radio channels, which simulate multiple mobile device transmissions individually subject to radio channel impairments, such as fading, to one or more eNBs and/or other network resources associated with LTE networks and/or other mobile networks. The systems and/or methods may implement channel emulation for a large number (e.g., greater than ten, one-hundred, one-thousand, or the like) of mobile devices by maintaining parameters and the fading state associated with the simulated radio channel of each mobile device.

FIG. 1 is a diagram of an overview of an example implementation 100 described herein. As shown, a testing device may communicate with multiple mobile networks, such as LTE networks. Each LTE network may include one or more base stations (e.g., eNBs) and the associated receive antenna ports. The testing device may include a channel emulator that produces test radio channels that simulate multiple mobile device transmissions subject to channel impairments. In some implementations, the testing device may introduce, into the simulated radio channels, fading channel conditions that satisfy a particular model, such as the wide-sense stationary and uncorrelated scattering (WSSUS) radio channel model. The WSSUS radio channel model describes a channel as a superposition of a large number of multi-path components with different propagation delays and Doppler shifts.

The testing device may generate channel realizations based on given fading channel models, and may generate test channels based on the channel realizations. Each of the test channels may simulate a radio channel between a mobile device and a base station (e.g., eNB). The testing device may provide the test channels to the eNBs. The eNBs may generate feedback information based on the test channels, and may provide the feedback information to the testing device. The feedback information may include, for example, uplink scheduling grants, retransmission requests, or the like, and may be used to determine other information, such as key performance indicators (KPI) associated with the eNBs, performance information associated with the eNBs, data throughput information, QoS information, or the like. The testing device may store the feedback/other information and/or may display the feedback/other information, as further shown in FIG. 1.

Systems and/or methods, described herein, may provide a testing device with a radio channel emulator that introduces channel impairments consistent with predefined fading channel models to enable testing and optimization of mobile networks.

Figure 2:
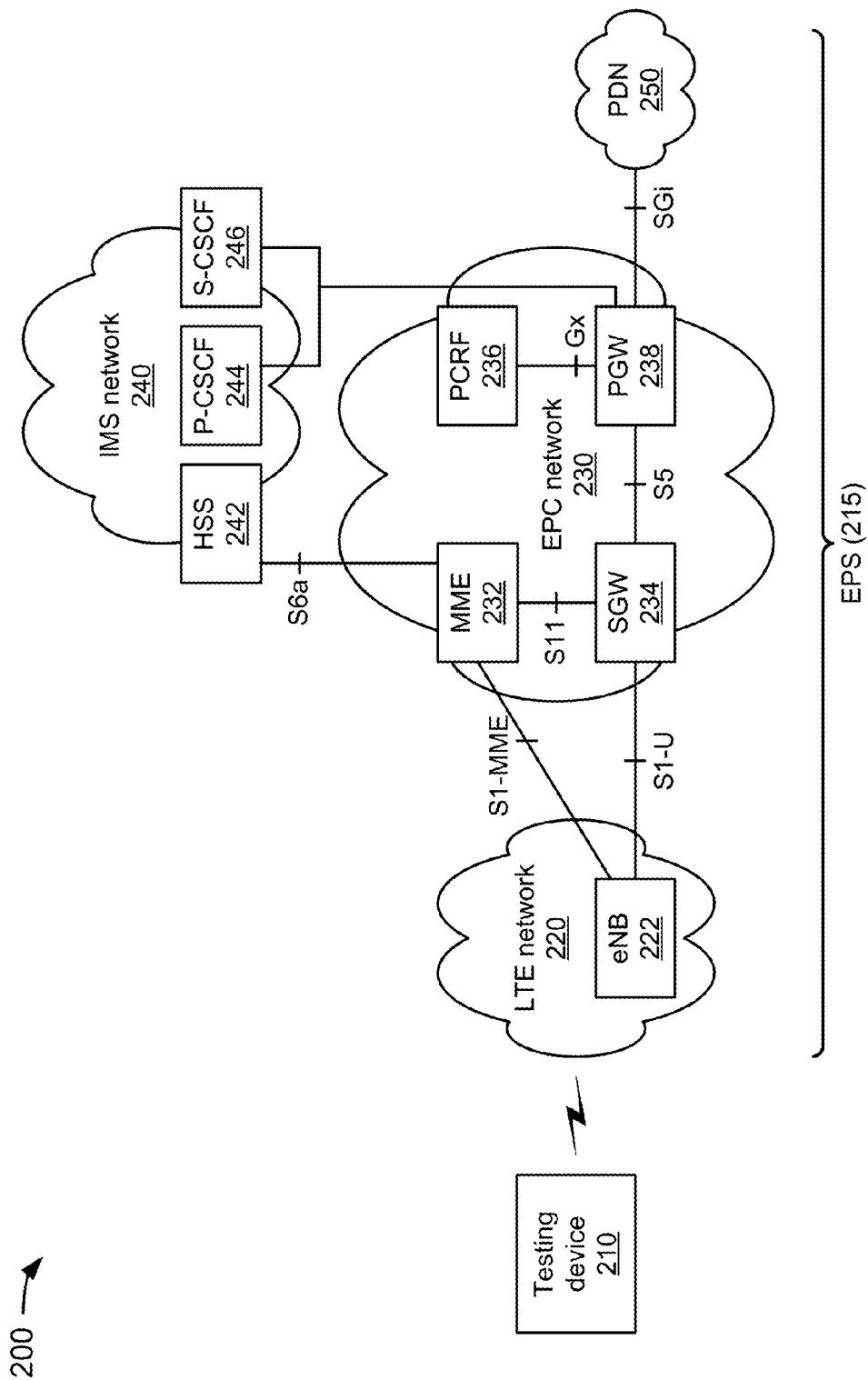
FIG. 2 is a diagram of an example environment in which systems and/or methods, described herein, may be implemented.

FIG. 2 is a diagram of an example environment 200 in which systems and/or methods, described herein, may be implemented. As illustrated, environment 200 may include a testing device 210, and an EPS 215 that includes a LTE network 220, an EPC network 230, an IMS network 240, and a PDN 250. LTE network 220 may include an eNB 222. EPC network 230 may include a mobility management entity (MME) 232, a serving gateway (SGW) 234, a policy and charging rules function (PCRF) 236, and a PDN gateway (PGW) 238. IMS network 240 may include a home subscriber server (HSS) 242, a proxy call session control function (P-CSCF) 244, and a serving call session control function (S-CSCF) 246. Devices/networks of environment 200 may connect via wired connections, wireless connections, or a combination of wired and wireless connections.

As further shown in FIG. 2, eNB 222 may connect with MME 232 over a S1-MME interface, and may connect with SGW 234 over a S1-U interface. MME 232 may connect with SGW 234 over a S11 interface, and may connect with HSS 242 over a S6a interface. SGW 234 may connect with PGW 238 over a S5 interface. PCRF 236 may connect with PGW 238 over a Gx interface. PGW 238 may connect with PDN 250 over a SGi interface, and may connect with P-CSCF 244 and S-CSCF 246. Other connections, not shown in FIG. 2, may also be utilized by EPS 215. For example, multiple MMEs 232 may connect with one another over S10 interfaces.

Testing device 210 may include one or more personal computers, one or more workstation computers, one or more server devices, one or more virtual machines (VMs) provided in a cloud computing environment, or one or more other types of computation and communication devices. In some implementations, testing device 210 may be utilized by an entity that manages and/or operates one or more portions of environment 200, such as, for example, a telecommunication service provider, a television service provider, an Internet service provider, or the like.

In some implementations, testing device 210 may include a channel emulator that produces test radio channels that simulate radio channels between multiple mobile devices and a base station (e.g., eNB). The channel emulator may introduce, into the test radio channels, fading channel impairments, which are realizations of a fading channel model. The channel emulator may generate such fading channel impairments for multiple mobile devices. The channel emulator may provide the test channels to one or more devices of EPS 215 (e.g., to eNB 222). eNB 222 may generate feedback information based on the test channels, and may provide the feedback information to testing device 210 for processing, storage, and/or display.

EPS 215 may include a core network architecture of the 3GPP LTE wireless communication standard. EPS 215 may include LTE network 220, EPC network 230, IMS network 240, and PDN 250. In some implementations, EPS 215 may provide a network for mobile devices. In some implementations, a mobile device may include a radiotelephone; a personal communications services (PCS) terminal that may combine, for example, a cellular radiotelephone with data processing and data communications capabilities; a smart phone; a television; a laptop computer; a tablet computer; a global positioning system (GPS) device; a gaming device; a set-top box (STB); a wearable device (e.g., smart glasses, a smart watch, or the like); or another type of computation and communication device.

LTE network 220 may include a communications network that connects users (e.g., mobile devices) to a service provider network. In some implementations, LTE network 220 may include a wireless local area network (WLAN) or another type of access network (e.g., an E-UTRAN or an eHRPD network). In some implementations, LTE network 220 may include a radio access network capable of providing a particular data rate, a particular latency, packet optimization, a particular capacity and coverage, etc.

eNB 222 may include one or more computation and communication devices, such as a base station, that receive traffic from MME 232 and/or SGW 234 and transmit that traffic to mobile devices. eNB 222 may also include one or more devices that receive traffic from mobile devices and transmit that traffic to MME 232 and/or SGW 234 or to other mobile devices. eNB 222 may combine the functionalities of a base station and a radio network controller (RNC) in 2G or 3G radio access networks.

EPC network 230 may include an IP packet-switched core network that supports high-speed wireless and wireline broadband access technologies. In some implementations, EPC network 230 may provide packet-switched voice and/or video services (e.g., which are traditionally circuit-switched) using IMS network 240 and PDN 250.

MME 232 may include one or more computation and communication devices that may be responsible for idle mode tracking and paging procedures (e.g., including retransmissions) for mobile devices. MME 232 may be involved in a bearer activation/deactivation process (e.g., for mobile devices) and may choose a SGW for mobile devices at an initial attach and at a time of intra-LTE handover. In some implementations, MME 232 may authenticate mobile devices. Non-access stratum (NAS) signaling may terminate at MME 232, and MME 232 may generate and allocate temporary identities to mobile devices. MME 232 may check authorization of a mobile device to utilize LTE network 220 and may enforce roaming restrictions for a mobile device. MME 232 may be a termination point in EPC network 230 for ciphering/integrity protection for NAS signaling and may handle security key management. MME 232 may provide a control plane function for mobility between LTE network 220 and other access networks with a S3 interface terminating at MME 232.

SGW 234 may include one or more devices that route and forward user data packets, may act as a mobility anchor for a user plane during inter-eNB handovers, and may act as an anchor for mobility between LTE and other 3GPP technologies. For idle state mobile devices, SGW 234 may terminate a downlink data path and may trigger paging when downlink data arrives for a mobile device. SGW 234 may manage and store contexts associated with a mobile device (e.g., parameters of an IP bearer service, network internal routing information, etc.). In some implementations, SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic.

PCRF 236 may include one or more computation and communication devices that provide policy control decision and flow based charging control functionalities. PCRF 236 may provide network control regarding service data flow detection, gating, QoS and flow based charging, etc. In some implementations, PCRF 236 may determine how a certain service data flow is to be treated, and may ensure that user plane traffic mapping and treatment is in accordance with a user's subscription profile.

PGW 238 may include one or more devices that provide connectivity of a mobile device to external PDNs (e.g., PDN 250) by being a traffic exit/entry point for a mobile device. A mobile device may simultaneously connect to more than one PGW 238 for accessing multiple PDNs. PGW 238 may perform policy enforcement, packet filtering for each user, charging support, lawful intercept, and packet screening. PGW 238 may also act as an anchor for mobility between 3GPP and non-3GPP technologies. In some implementations, PGW 238 may include one or more traffic transfer devices (or network devices), such as a gateway, a router, a switch, a firewall, a NIC, a hub, a bridge, a proxy server, an OADM, or some other type of device that processes and/or transfers traffic.

IMS network 240 may include an architectural framework or network (e.g., a telecommunications network) for delivering IP multimedia services. In some implementations, IMS network 240 may include a standardized reference architecture that provides session control, a connection control and an applications services framework, and user and services data.

HSS 242 may include one or more computation and communication devices that provide a master user database that supports devices of IMS network 240 that handle calls. HSS 242 may contain subscription-related information (e.g., user profiles), may perform authentication and authorization of a user, and may provide information about a user's location and IP information.

P-CSCF 244 may include one or more computation and communication devices that function as a proxy server for a mobile device, where session initiation protocol (SIP) signaling traffic to and from a mobile device may go through P-CSCF 244. In some implementations, P-CSCF 244 may validate and then forward requests from a mobile device, and may process and forward responses to a mobile device.

S-CSCF 246 may include one or more computation and communication devices that function as a central node of a signaling plane, and perform session control. In some implementations, S-CSCF 246 may handle SIP registrations in order to bind a user location (e.g., an IP address of a mobile device) and a SIP address, and may inspect a path of all signaling messages of locally registered users. In some implementations, S-CSCF 246 may decide to which application server(s) a SIP message may be forwarded in order to receive services of the application server(s), may provide routing services (e.g., using electronic numbering (ENUM) lookups), and may enforce a policy of a network operator.

PDN 250 may include one or more data communications networks that are based on packet switching, as opposed to circuit switching that is used in public telephone networks. In some implementations, PDN 250 may be capable of communicating with a mobile device over IMS network 240.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
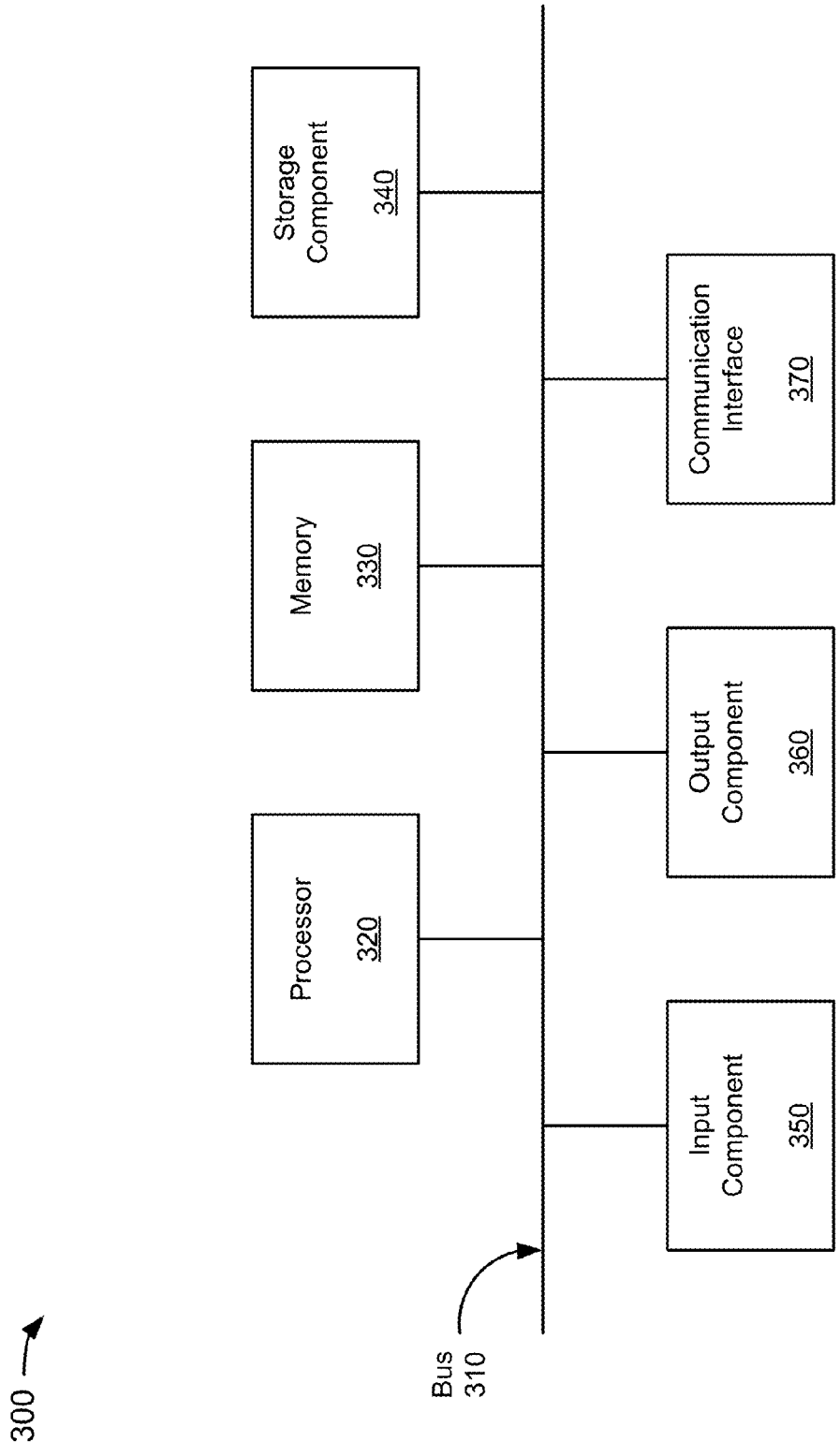
FIG. 3 is a diagram of example components of a device that may correspond to one or more of the devices of the environment depicted in FIG. 2.

FIG. 3 is a diagram of example components of a device 300. Device 300 may correspond to testing device 210, eNB 222, MME 232, SGW 234, PCRF 236, PGW 238, HSS 242, P-CSCF 244, and/or S-CSCF 246. In some implementations, testing device 210, eNB 222, MME 232, SGW 234, PCRF 236, PGW 238, HSS 242, P-CSCF 244, and/or S-CSCF 246 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. In some implementations, processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
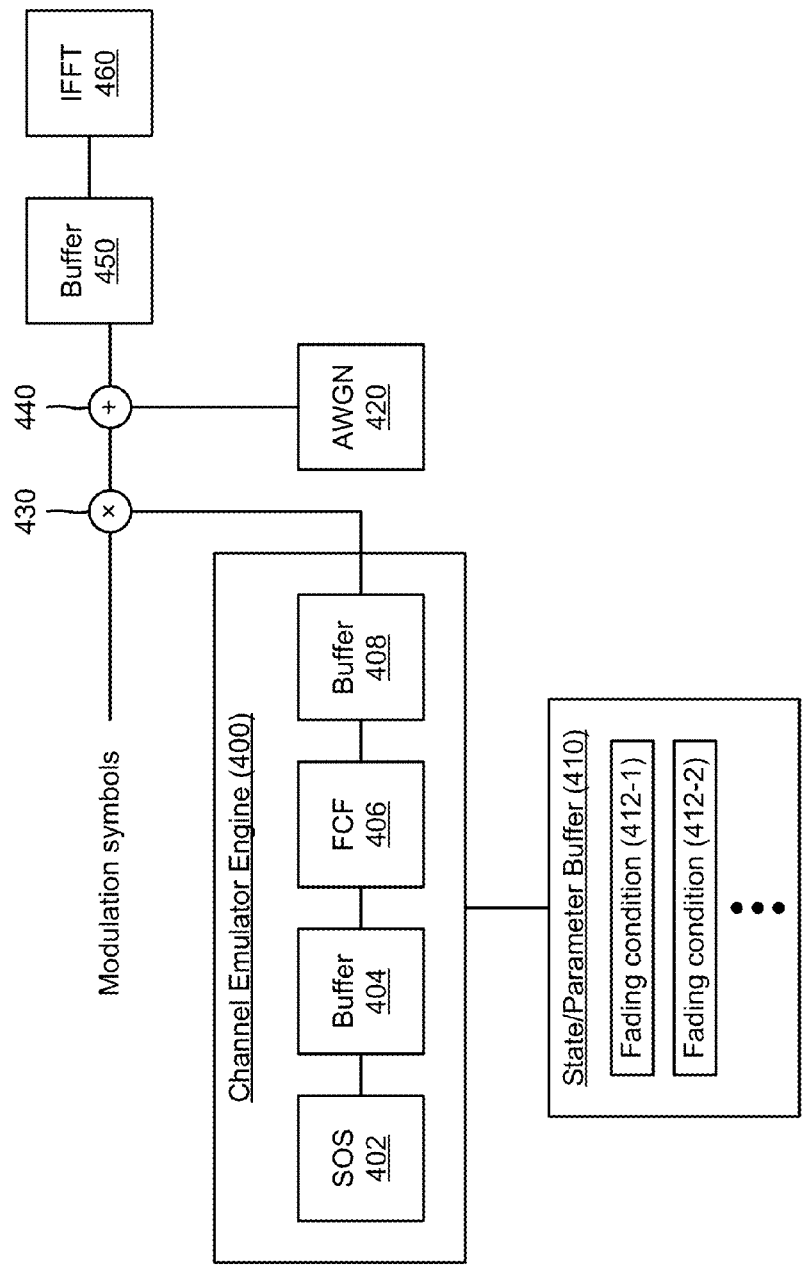
FIGS. 4A and 4B are diagrams of example functional components of a testing device depicted in FIG. 2.
Figure 4B:
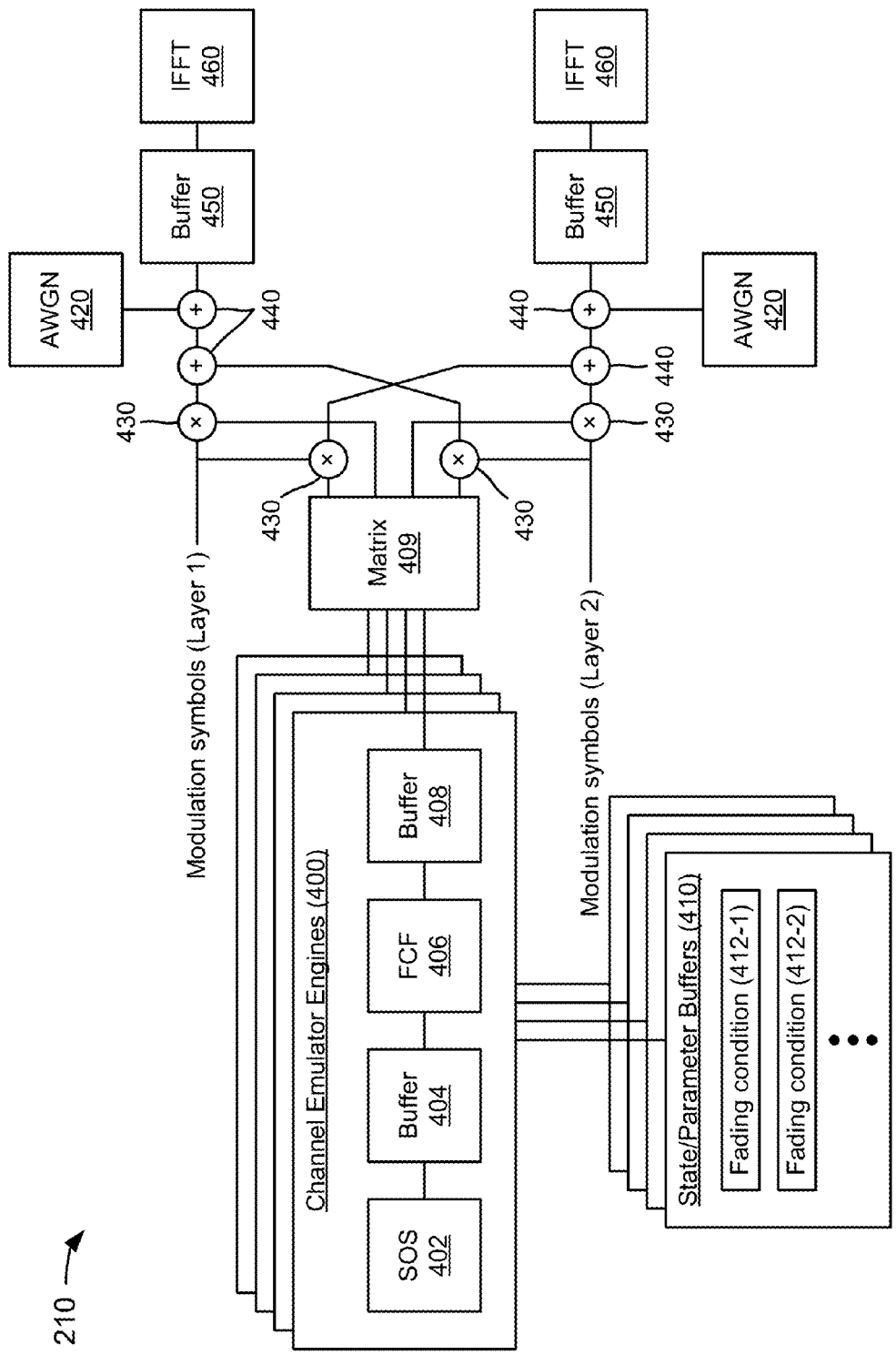

FIGS. 4A and 4B are diagrams of example functional components of testing device 210. As shown in FIG. 4A, testing device 210 may include a channel emulator engine 400, a state/parameter buffer 410, an additive white Gaussian noise (AWGN) component 420, a multiplier component 430, an adder component 440, a buffer 450, and an inverse fast Fourier transform (IFFT) component 460. Channel emulator engine 400 may include a sum-of-sinusoids (SOS) processor 402, a buffer 404, a frequency correlation function (FCF) component 406, and a buffer 408. State/parameter buffer 410 may store fading channel conditions 412-1 through 412-N (N≥1) (collectively referred to herein as fading channel conditions 412, and, in some instances, singularly as fading channel condition 412), associated with mobile devices 1 through N to be simulated. A fading channel condition may include, for example, fading engine state information and fading model parameters.

Channel emulator engine 400 may include components that produce test radio channels that simulate radio channels for multiple mobile devices. In some implementations, channel emulator engine 400 may introduce, into the test radio channels, fading channel conditions (e.g., stored in state/parameter buffer 410) that satisfy a particular model, such as the WSSUS radio channel model.

Channel emulator engine 400 may include a component that generates a high clock rate, and utilizes the clock rate to generate and apply fading channel realizations for multiple mobile devices while using only a single or a small number of hardware instances of SOS processor 402 and/or FCF component 406 operating at the high clock rate. For example, SOS processor 402 may read state information from the state/parameter buffer 410 every clock cycle associated with the high clock rate.

Buffer 404 may include a memory that temporarily stores a random vector received from SOS processor 402, until the FCF component 406 has processed the random vector.

FCF component 406 may include one or several matrices that represent one or several fading models, whose selection is controlled by a parameter. FCF component 406 may include a component that receives random vectors from buffer 404, and requests fading model parameters 412 associated with mobile devices 1 through N to be simulated, from state/parameter buffer 410. In some implementations, FCF component 406 may generate random vectors whose covariance is determined by parameters stored with fading channel condition 412. In some implementations, FCF component 406 may utilize sequential techniques to reduce a number of hardware multipliers associated with FCF component 406. In some implementations, FCF component 406 may utilize a special structure (e.g., a lower triangular matrix) to reduce a number of operations.

Buffer 408 may include a memory that temporarily stores the time- and frequency-correlated random vectors received from FCF component 406 before the random vectors are provided to multiplier component 430.

State/parameter buffer 410 may include a memory that stores parameter and fading state information (e.g., fading channel conditions 412) for every mobile device to be simulated. In some implementations, processor 320 may update state/parameter buffer 410 when scheduling information for a next sub-frame becomes available. In some implementations, state/parameter buffer 410 may be local to processor 320 or to channel emulator engine 400, and may determine an amount and a rate of information to be passed from the host processor to channel emulator engine 400. In some implementations, state/parameter buffer 410 may utilize a cache policy where a fading state associated with a simulated mobile device may be discarded when the simulated mobile device is not utilized for a test channel for at least a particular amount of time, related to the channel coherence time, which may result in significant memory savings.

In some implementations, every simulated mobile device may be subject to different fading channel conditions, as specified by a Doppler frequency or a Doppler spectrum and a power delay profile, at different times. Such conditions may vary relatively slowly over time for a simulated mobile device. In some implementations, state/parameter buffer 410 may adjust the Doppler rate dynamically (e.g., which may affect fading state update equations), and channel emulator engine 400 may receive matrices in FCF component 406, so that a hardware-configurable number of different fading channel conditions 412 may be available instantaneously. Fading channel conditions 412 may be standardized (e.g., according to the 3GPP standard) and/or may be obtained from theoretical radio propagation models or through actual radio channel measurements.

AWGN component 420 may include a component that simulates interference from neighboring cells of EPS 215. In some implementations, AWGN component 420 may simulate the interference based on a noise model used in information theory to mimic the effect of many random processes that occur in nature. The interference may be additive because the noise may be added to any noise that might be intrinsic to a system. The noise may be white when the interference power is uniformly distributed across a frequency band for the system. The noise may be non-white when the interference is known to be frequency selective. The noise may be time-variant when the interference to be simulated is known to vary over time. The noise model may be zero-mean Gaussian or follow some other distribution. In some implementations, testing device 210 may determine actual interference caused by neighbor mobile networks to EPS 215, and may utilize the actual interference instead of the simulated interference.

Multiplier component 430 may include a component that performs element-wise multiplication of the time- and frequency-correlated random vector (e.g., generated by the channel emulator engine 400) and modulation symbols that are mapped to subcarriers of a radio channel. Multiplier component 430 may provide a result of the multiplication to adder component 440.

Adder component 440 may include a component that adds the result of the multiplication (e.g., received from multiplier component 430) and the interference information generated by AWGN component 420. Adder component 440 may provide the calculated sum to buffer 450. In some implementations, the calculated sum may correspond to a test channel that simulates the multiple mobile devices.

Buffer 450 may include a memory that temporarily stores the test channel received from adder component 440 before the test channel is provided to IFFT component 460.

IFFT component 460 may include a component that transforms the test channel from a frequency domain into a time domain, and provides the time-domain test channel to a network resource of EPS 215, such as eNB 222.

As shown in FIG. 4B, in some implementations, testing device 210 may include multiple channel emulator engines 400, state/parameter buffers 410, AWGN components 420, multiplier components 430, adder components 440, buffers 450, and IFFT components 460. As further shown in FIG. 4B, testing device 210 may include a spatial correlation matrix component 409 that communicates with channel emulator engines 400 and multiplier components 430. In some implementations, the configuration depicted in FIG. 4B may correspond to a multiple-in/multiple-out (MIMO) configuration for multi-antenna transmission (e.g., shown for a two antenna case, but may include M antennas, where M>2). In some implementations, each channel emulation engine 400 may be associated with a corresponding state/parameter buffer 410, and each channel emulation engine 400 may provide a set of time- and frequency-correlated random vectors to spatial correlation matrix 409. In some implementations, spatial correlation matrix 409 may provide one or more sets of the random vectors to each multiplier component 430. In some implementations, spatial correlation matrix 409 may be either selected from a set of predefined matrices, and/or may be configured by a user of test device 210.

The number and arrangement of functional components shown in FIGS. 4A and 4B are provided as an example. In practice, testing device 210 may include additional functional components, fewer functional components, different functional components, or differently arranged functional components than those shown in FIGS. 4A and 4B. Additionally, or alternatively, a set of functional components (e.g., one or more functional components) of testing device 210 may perform one or more functions described as being performed by another set of functional components of testing device 210.

FIG. 5 is a flow chart of an example process 500 for testing network resources via channel emulation. In some implementations, one or more process blocks of FIG. 5 may be performed by testing device 210. In some implementations, one or more process blocks of FIG. 5 may be performed by another device or a group of devices separate from or including testing device 210, such as, for example, eNB 222.

As shown in FIG. 5, process 500 may include configuring fading channel conditions to utilize for simulating behavior of a large number of mobile devices (block 510). For example, testing device 210 may configure fading channel conditions to utilize for simulating the behavior of a large number of mobile devices. In some implementations, the large number of mobile devices may include more than one mobile device, ten or more mobile devices, one-hundred or more mobile devices, one-thousand or more mobile devices, or the like. In some implementations, testing device 210 may receive the fading channel conditions from a user of testing device 210. For example, a user may cause testing device 210 to create or open a user interface. One or more fading channel conditions may be added to the user interface by the user. For example, in some implementations, testing device 210 may receive a command, from the user, that indicates that a fading channel condition is to be added to the user interface. Client device 210 may receive the command based, for example, on detecting a selection of a particular menu item, entry of a particular textual or audible input from the user, and/or entry of some other predetermined input that indicates a desire to add a fading channel condition to the user interface. In another example, testing device 210, via the user interface, may display multiple fading channel conditions from which the user may select for each simulated mobile device.

In some implementations, state/parameter buffer 410 of testing device 210 may store the fading channel conditions as parameter and fading state information (e.g., fading channel conditions 412) for every mobile device to be simulated. In some implementations, testing device 210 may receive the fading channel conditions from state/parameter buffer 410, and may update state/parameter buffer 410 when fading channel conditions for a next sub-frame become available. In some implementations, the fading channel conditions may include time-correlated Rayleigh processes with a fading state maintained between time steps. In some implementations, the fading channel conditions may include different fading channel models, as specified by a Doppler and power delay profile, at different times. In some implementations, fading channel conditions may vary relatively slowly over time for a simulated mobile device. In some implementations, fading channel conditions may vary relatively quickly over time for a simulated mobile device. In some implementations, testing device 210 may adjust the Doppler rate dynamically, and may receive matrices in FCF component 406, so that a hardware-configurable number of different fading channel conditions 412 may be provided. Fading channel conditions 412 may be obtained through actual tests of network resources (e.g., eNBs 222) of mobile networks.

In some implementations, testing device 210 may generate multiple fading channel conditions randomly or based on specific criteria (e.g., the 3GPP standards). In some implementations, testing device 210 may randomly generate fading channel conditions that satisfy assumptions associated with the WSSUS radio channel model. The WSSUS radio channel model may describe a channel as a superposition of a large number of multi-path components (e.g., multiple devices) with different propagation delays and Doppler shifts. The WSSUS radio channel model may include a wide-sense stationary (WSS) assumption indicating that contributions to the channel with different Doppler shifts are uncorrelated, and an uncorrelated scattering (US) assumption indicating that no correlation exists between contributions with different propagation delays.

In some implementations, the WSSUS radio channel model may be time and frequency variant. In some implementations, the WSSUS radio channel model may include a stationarity assumption (e.g., an assumption that the channel is stationary) that enables expression of second order statistics of the WSSUS radio channel model in the form of a bi-variate, time-frequency autocorrelation function. Due to Fourier duality, a set of autocorrelation and spectral density functions may provide equivalent descriptions of the WSSUS radio channel model. A scattering function $S(v, \tau)$ may characterize received power as a function of a Doppler frequency (v) and a propagation delay ($\tau$). Based on the assumptions that the same Doppler power spectral density applies to every propagation delay, and that the power delay profile is the same for every frequency within a bandwidth of the channel, the scattering function may factor into a product of a Doppler power spectral density $P(v)$ and a power delay profile $Q(\tau)$ as follows: $S(v, \tau)=P(v)Q(\tau)$. Thus, the Doppler spectral density and the power delay profile may describe the WSSUS radio channel model in a form that is used, for example, by the 3GPP to define the fast fading channel conditions for LTE equipment testing. In some implementations, if the power delay profile is represented by a weighted sum of discrete impulses, the WSSUS radio channel model may be implemented in the time domain as a tapped delay line, where the tap weights are independent, complex Gaussian processes with the Doppler power spectral density.

As further shown in FIG. 5, process 500 may include generating channel realizations based on the configured fading channel conditions (block 520). For example, testing device 210 may generate channel realizations based on the configured fading channel conditions. In some implementations, testing device 210 may initially determine Fourier transform ($F^1$) duals of the power delay profile $Q(\tau)$ and the Doppler spectral density $P(v)$ according to:

$$q(\Delta f) = F^{-1}\{Q(\tau)\}$$

$$p(\Delta t) = F^{-1}\{P(v)\},$$

where $q(\Delta f)$ may correspond to a frequency correlation function and $p(\Delta t)$ may correspond to a time correlation function. The Doppler spectral density may arise when, for a given propagation delay and a maximum Doppler frequency ($v_D$), an angle of incidence is assumed to be uniformly distributed between 0 and $2\pi$. In such a case, the power spectral density may include a form of:

$$P(v) = \begin{cases} \dfrac{1}{\pi\sqrt{v_D^2 - v^2}} & \text{for } |v| < v_D \\ 0 & \text{othewise} \end{cases}.$$

The corresponding time correlation function may be characterized by a 0-th order Bessel function as follows: $p(\Delta t) = J_0(2\pi v_D |\Delta t|)$.

In some implementations, since channel emulator engine 400 of testing device 210 may operate in the digital baseband (e.g., in discrete time and frequency), correlation functions may be truncated in length and sampled using suitable step sizes $\Delta_f$ and $\Delta_t$. The step sizes may satisfy the conditions $\Delta_f \ll 1/L_{coh}$ and $\Delta_t \ll T_{coh}$, where $B_{coh}$ may correspond to the channel's coherence bandwidth and $T_{coh}$ may correspond to the channel's coherence time. A resulting n-dimensional vector of frequency correlation values and an m-dimensional vector of time correlation values may be used by testing device 210 to construct Toeplitz covariance matrices $C_f$ and $C_t$.

In some implementations, testing device 210 may generate a complex random vector (h) with an arbitrary covariance ($E[hh^H]=C$) through linear transformation of another complex random vector (w) with a covariance ($E[ww^H]=I$), according to: $h=Lw$, where L may correspond to a matrix square root of C (i.e., $C=LL^H$). Testing device 210 may determine the factor L by Cholesky decomposition of C, where the Cholesky factor L may be a lower triangular matrix.

In some implementations, testing device 210 may generate a time-discrete and frequency-discrete random realization of the WSSUS radio channel model (e.g., based on the fading channel conditions) over n frequency points and m time steps according to: $H=L_f W L_t^H$, where H may correspond to an n×m matrix of channel coefficients or realizations, W may correspond to an n×m matrix of independent and identically distributed (i.i.d.) complex, normal random variates, and $L_f$ and $L_t$ may correspond to the Cholesky factors of the covariance matrices associated with the frequency and time correlation functions $q(\Delta f)$ and $p(\Delta t)$, respectively.

In some implementations, a computational complexity associated with channel emulator engine 400 of testing device 210 may be determined by a number of sample points (e.g., n and m) used to discretize the frequency and time correlation functions of the channel. The choice of the sample points (e.g., n and m) may impact how closely channel emulator engine 400 approximates realizations from a WSSUS radio channel model. Relatively long channel coherence times ($T_{coh}$) may be encountered by testing device 210, which implies correspondingly large values of m. This may introduce excessive computational and memory requirements for testing device 210, as reflected in the size of $L_f$. In some implementations, since the values of n may be much smaller than m, testing device 210 may utilize the frequency correlation function, through multiplication with the Cholesky factor $L_f$, with reasonable computational requirements.

Because a magnitude of a complex Gaussian process has a Rayleigh distribution, such processes may be referred to as Rayleigh processes. In some implementations, testing device 210 may generate n independent realizations of Rayleigh processes, each with a time correlation function $p(\Delta t)$. In some implementations, testing device 210 may approximate a Rayleigh process by a finite sum of sinusoids (SOS) in a deterministic or semi-deterministic (e.g., using random initial parameters) fashion. Such techniques may be suitable for real-time online operation of channel emulator engine 400 for large-scale multi-mobile device simulation. In some implementations, channel emulator engine 400 may generate n processes with a joint distribution that approximates n independent Rayleigh processes with an autocorrelation of $p(\Delta t)$, according to: $V \sim WL_t^H$, where V may correspond to an n×m matrix with each row representing one Rayleigh process and determined by applying the SOS techniques. In some implementations, at a particular time step (e.g., an OFDM symbol index l), testing device 210 may generate a particular column of V, which consists of a particular sample of each of the n Rayleigh processes. By multiplying with $L_f$, testing device 210 may obtain a vector ($H_l$) of frequency-correlated channel realizations or coefficients, as follows: $H_l = L_f V_l$, which may be a realization of a frequency-varying channel at a particular time (l).

As further shown in FIG. 5, process 500 may include generating a test channel based on the channel realizations (block 530). For example, testing device 210 may generate a test channel based on the generated channel realizations. In some implementations, testing device 210 may generate the test channel by multiplying element-wise (denoted ⓧ herein), the vector of channel realizations ($H_l$) associated with the symbol index (l) with a vector of modulation symbols ($X_l$) that are mapped to subcarriers of the radio channel (e.g., an LTE uplink channel), as follows: $X_l \otimes H_l$. In some implementations, testing device 210 may factor interference from neighbor cells into the test channel by adding an interference vector $N_l$ to $X_l \otimes H_l$, to generate the test channel ($Y_l$) (e.g., a faded subcarrier-domain) as follows: $Y_l = X_l \otimes H_l + N_l$. In some implementations, the contributions from multiple mobile devices, subject to fading and additive interference, may be accumulated in the subcarrier domain with the test channel ($Y_l$). For example, for a set (M) of mobile devices that are scheduled for transmission during time (l), and $X_l^i$, $H_l^i$ denoting the modulation symbols and channel realizations of a mobile device (i, where i∈M), testing device 210 may generate the test channel ($Y_l$) according to:

$$Y_l = \sum_{i \in M} X_l^i \otimes H_l^i + N_l$$

In some implementations, the test channel may include an aggregate channel that simulates an actual channel received at a network resource (e.g., eNB 222), and may include a weighted sum of transmit signals of a large number of mobile devices that are individually and independently subject to channel impairments and delays. In some implementations, the channel impairments may include a combination of mean path loss, shadowing, and fast fading. In some implementations, interference signals, which represent mobile devices in neighboring cells, may be added to the test channel. In some implementations, the test channel may simulate an uplink channel or a downlink channel.

The continuously time-varying nature of the WSSUS radio channel model may be responsible for the introduction of inter-carrier interference (ICI) in OFDM. In some implementations, testing device 210 may utilize a discrete-time simulation of the test channel so that the test channel response is constant for the duration of a time step and so that subcarrier orthogonality is preserved. In some implementations, there may be no appreciable degradation of the error performance due to ICI up to the worst-case normalized Doppler frequency VA, and a discrete-time test channel may provide a good approximation of continuously time-varying channels.

In some implementations, if a maximum propagation delay of the test channel does not exceed a duration of a cyclic prefix (CP) (i.e., $\Sigma_{max} \leq T_{CP}$), propagation delays may manifest as cyclic delays for a non-CP portion of an OFDM symbol, and no inter-symbol interference (ISI) may be introduced in the test channel. In some implementations, a CP portion of the OFDM symbol may be disregarded by a receiver device. In some implementations, a receiver device may accept some deviations (e.g., between a real channel and a test channel) that are restricted to the CP portion of the OFDM symbol.

In some implementations, introduction of a frequency offset ($f_0$) (e.g., equivalent to one-half of subcarrier spacing) into a test channel may have a negligible effect on channel models where $f_0 \ll B_{coh}$, and for the fading channel conditions described herein. A frequency-translated signal subject to multipath fading may be described according to:

$$F\left\{\sum a_i e^{j2\pi f_0(t-\tau_i)}\right\} = X(f - f_0)\sum a_i e^{-j2\pi f \tau_i}$$
$$= X(f - f_0)H(f).$$

In some implementations, testing device 210 may generate a frequency-translated signal subject to multipath fading as follows:

$$F\left\{e^{j2\pi f_0 t}\sum a_i x(t-\tau_i)\right\} = X(f - f_0)\sum a_i e^{-j2\pi f \tau_i} e^{j2\pi f_0 \tau_i}$$
$$= X(f - f_0)\sum a_i e^{j2\pi(f-f_0)\tau_i}$$
$$= X(f - f_0)H(f - f_0)H(f - f_0).$$

In some implementations, an effective channel response may be frequency translated by the frequency offset ($f_0$), which has a negligible effect as long as $f_0 \ll B_{coh}$. Furthermore, the frequency translation may not change statistics associated with the channel response due to the stationarity of the WSSUS radio channel model.

As further shown in FIG. 5, process 500 may include providing the test channel to a receiver device (block 540). For example, testing device 210 may provide the test channel to a receiver device of environment 200, such as, for example eNB 222. In some implementations, testing device 210 (e.g., IFFT component 460) may convert the test channel from a frequency domain to a time domain, and may provided the converted test channel to eNB 222. In some implementations, testing device 210 may provide the test channel to an uplink channel associated with each antenna port of eNB 222. The test channel may simulate an actual channel received by eNB 222 in the real world. The test channel may cause eNB 222 to perform functions associated with processing an actual channel received by eNB 222, and to generate feedback information based on performance of the functions. In some implementations, eNB 222 may provide the feedback information to testing device 210.

As further shown in FIG. 5, process 500 may include receiving feedback information from the receiver device based on the test channel (block 550). For example, testing device 210 may receive the feedback information from eNB 222 based on the test channel. In some implementations, the feedback information may include, for example, uplink scheduling grants, retransmission requests, or the like, and may be used to determine other information, such as key performance indicators (KPIs) associated with eNB 222 (e.g., a number of session activation successes, a number of session activation rejections, a number of outgoing calls dropped, call setup times, packet delays, packet throughputs, packet losses, or the like); functional information (e.g., performance associated with eNB 222, performance of an interface of eNB 222, or the like); system performance information (e.g., maximum data throughput, packet latency, packet loss, jitter, or the like); stress testing under traffic load information (e.g., impact on eNB 222 due to the test channel, integrity of signaling under the load of the test channel, or the like); data application performance information (e.g., QoS provided by eNB 222, impact of QoS on data throughput, or the like); scheduler information (e.g., resource allocation by a scheduler of eNB 222, performance by the scheduler, or the like); or the like.

As further shown in FIG. 5, process 500 may include outputting and/or storing the feedback information and/or other information (block 560). For example, testing device 210 may output and/or store the feedback information received from eNB 222 and/or the other information. In some implementations, testing device 210 may store the feedback information and/or the other information in a data structure provided in memory (e.g., memory 330 and/or storage component 340, FIG. 3). In some implementations, testing device 210 may display the data structure with the feedback information and/or the other information, via a user interface, to a user associated with testing device 210. In some implementations, testing device 210 may display portions of the feedback information and/or the other information via a user interface. For example, testing device 210 may display feedback information that indicates problems associated with eNB 222, and may not display feedback information that do not indicate problems associated with eNB 222.

In some implementations, testing device 210 may perform an analysis of the feedback information in order to generate optimization recommendations. For example, based on the analysis of the feedback information, testing device 210 may recommend a modified load balancing for eNB 222, may recommend a particular resource allocation, may recommend modifying eNB 222 (e.g., adjusting antennas associated with eNB 222, increasing throughput associated with eNB 222, or the like). In some implementations, testing device 210 may store and/or display the optimization recommendations to a user of testing device 210.

In some implementations, testing device 210 may provide notifications of problems associated with the feedback information to users (e.g., network administrators, network engineers, network maintenance personnel, or the like) associated with different devices of environment 200. For example, assume that a first user is responsible for maintaining eNB 222 and that a second user is responsible for maintaining MME 232. Further, assume that the feedback information indicates that eNB 222 and MME 232 experienced problems with a call. In such an example, testing device 210 may provide the first user with a notification of the problem experienced by eNB 222 and may provide the second user with a notification of the problem experienced by MME 232. In some implementations, testing device 210 may provide the notifications to users via different notification methods. For example, testing device 210 may provide a notification about the feedback information via an email message (e.g., email the notification to "jsmith@web.com"), a text message (e.g., text the notification to "999-222-4567"), an instant message (e.g., instant message (IM) the notification to a particular IM user), a voicemail message (e.g., provide voicemail of notification to "555-444-2222"), or the like.

In some implementations, the recommendations, the notifications, and/or the outputting of the feedback information may enable users (e.g., network administrators, network engineers, network maintenance personnel, or the like) associated with different devices of environment 200 to troubleshoot problems. For example, the feedback information may permit quick and easy troubleshooting of a device in environment 200 and may reduce the time and expense associated with troubleshooting.

In some implementations, the feedback information may cause an automatic action to be performed. For example, testing device 210 may, based on the feedback information, cause a maintenance schedule of a maintenance worker to be automatically updated, an operation of eNB 222 to be automatically adjusted, or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
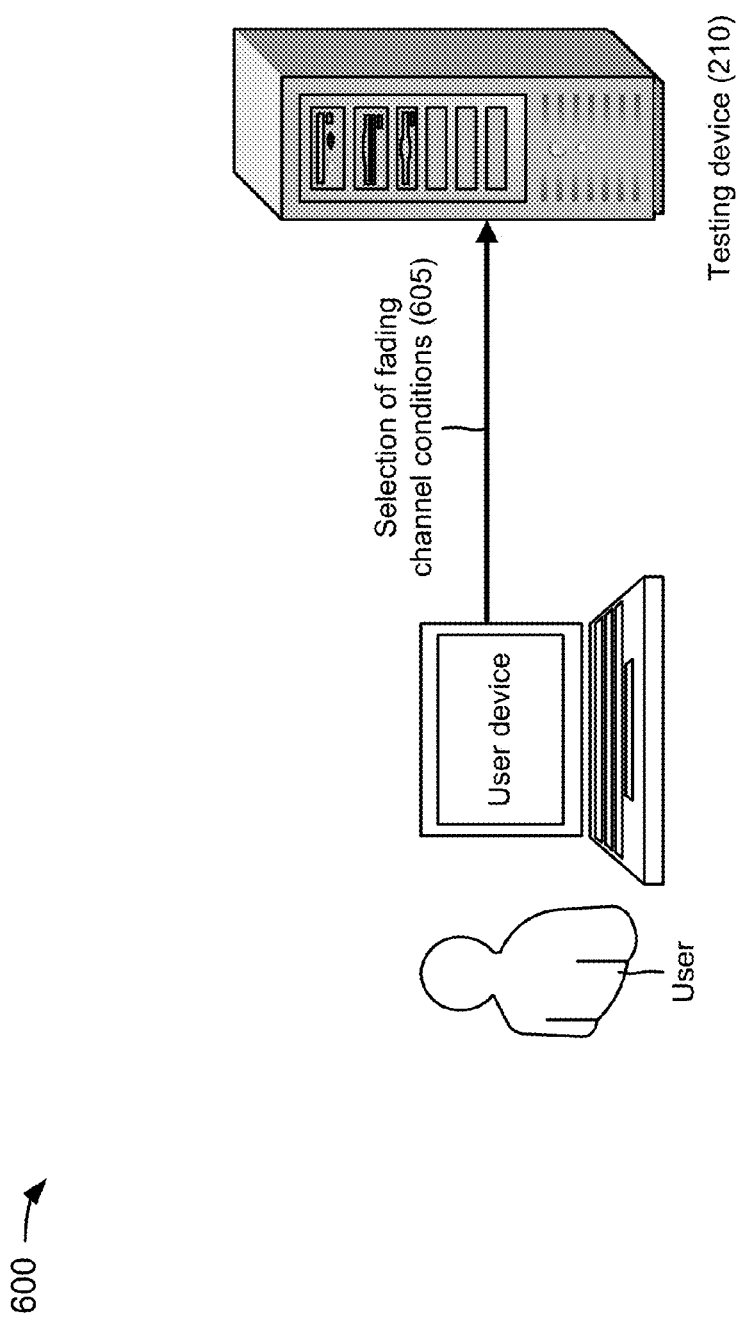

FIGS. 6A-6D are diagrams of an example 600 relating to example process 500 shown in FIG. 5. As shown in FIG. 6A, assume that a user (e.g., a network administrator, a network engineer, network maintenance personnel, or the like) associated with eNB 222 of environment 200 utilizes a user device (e.g., a laptop computer) to communicate with testing device 210. In some implementations, testing device 210 may include input devices (e.g., a keyboard, a mouse, or the like) and an output device (e.g., a display) that enables the user to communicate directly with testing device 210. As further shown in FIG. 6A, the user may utilize the laptop computer to instruct testing device 210 to utilize particular fading channel conditions for a particular number of mobile devices to be simulated by testing device 210, as indicated by reference number 605. Testing device 210 may receive (e.g., from state/parameter buffer 410) the fading channel conditions based on the user's instruction.

Figure 6B:
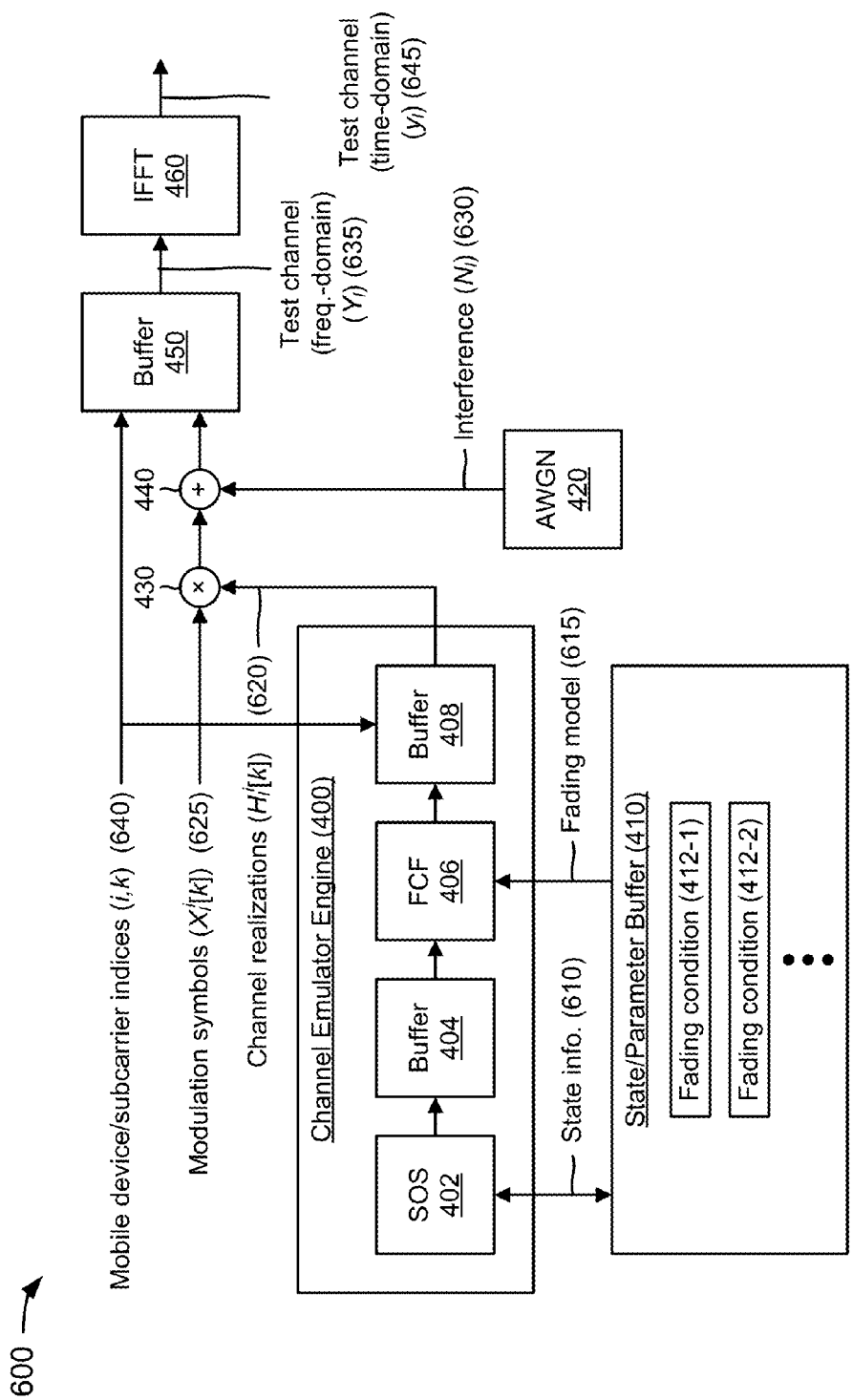

As shown in FIG. 6B, based on the user's instruction, SOS processor 402 may provide state information 610 to buffer 404 and state/parameter buffer 410. State information 610 may indicate the fading channel conditions to utilize, as specified by the user's instructions. Buffer 404 may provide state information 610 to FCF component 406. Based on state information 610, state/parameter buffer 410 may provide the requested fading channel conditions (e.g., fading channel conditions 412) to FCF component 406, as indicated by reference number 615. FCF component 406 may determine channel realizations ($H_j$) based on fading channel conditions 615, and may provide the channel realizations ($H_j$) to buffer 408. Buffer 408 may provide the channel realizations ($H_j$) to multiplier component 430, as indicated by reference number 620.

As further shown in FIG. 6B, multiplier component 430 may receive modulation symbols ($X_j$) 625, and may multiply, element-wise, channel realizations ($H_j$) 620 and modulation symbols ($X_j$) 625. Multiplier component 430 may provide a result of the multiplication to adder component 440. AWGN component 420 may provide interference information ($N_j$) 630 to adder component 440. Adder component 440 may add the result of the multiplication (e.g., received from multiplier component 430) and interference information ($N_j$) 630 to generate a test channel ($Y_j$) 635 in the frequency domain. Adder component 440 may provide test channel ($Y_j$) 635 to buffer 450. Buffer 450 may also receive mobile device and/or subcarrier indices (i, k) 640. Buffer 450 may provide test channel ($Y_j$) 635 and mobile device/subcarrier indices (i, k) 640 to IFFT component 460. IFFT component 460 may utilize test channel ($Y_j$) 635 and mobile device/subcarrier indices (i, k) 640 to convert test channel ($Y_j$) 635 from a frequency domain to a time domain, as indicated by reference number 645. IFFT component 460 may transmit converted test channel ($Y_j$) 645.

Figure 6C:
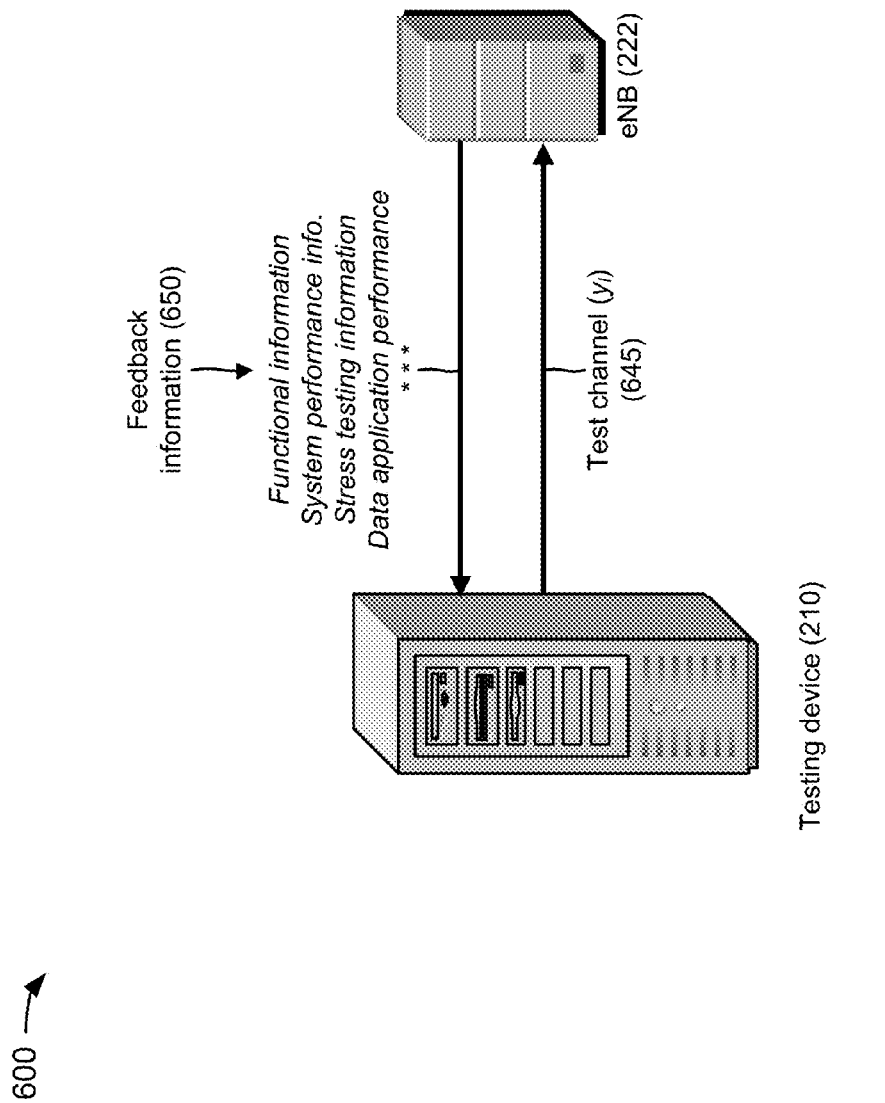

As shown in FIG. 6C, testing device 210 may provide converted test channel ($Y_j$) 645 to eNB 222, via a wireless connection and/or a wired connection. eNB 222 may receive converted test channel ($Y_j$) 645, and may perform functions associated with processing an actual test channel received by eNB 222. Based on performance of the functions, eNB 222 may generate feedback information 650 (e.g., or information generated based on feedback information), such as functional information, system performance information, stress testing information, data application performance, or the like. As further shown in FIG. 6C, eNB 222 may provide feedback information 650 to testing device 210, and testing device 210 may receive and store feedback information 650.

As shown in FIG. 6D, testing device 210 may provide feedback information 650 for display via a user interface 655. User interface 655 may display feedback information 650 in a variety of ways, such as in a table format, a textual format, a graphical format, or the like. For example, as shown in FIG. 6D, user interface 655 may display feedback information 650 in a textual format that includes functional information (e.g., performance of eNB 222, performance of interface at eNB 222, or the like); system performance information (e.g., maximum data throughput, packet latency, jitter, or the like, associated with eNB 222); stress testing under traffic load information (e.g., impact on radio frequency (RF) resources associated with eNB, integrity of signaling under load by eNB 222, or the like); data application performance information (e.g., QoS of eNB 222, impact of QoS on data throughput by eNB 222, or the like); scheduler information (e.g., performance of a scheduler associated with eNB 222, resource allocation by eNB 222, or the like); or the like.

As indicated above, FIGS. 6A-6D are provided merely as an example. Other examples are possible and may differ from what was described with regard to FIGS. 6A-6D. In some implementations, the various operations described in connection with FIGS. 6A-6D may be performed automatically or at the request of a user.

Systems and/or methods, described herein, may provide a testing device with a radio channel emulator that introduces channel impairments consistent with fading channel conditions to enable testing and optimization of mobile network resources and infrastructure. In some implementations, the radio channel emulator may provide test channels, which simulate radio channels generated by multiple mobile devices, to a network resource associated with a mobile network.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, or the like). The user interfaces may receive user inputs via one or more input devices, may be user-configurable (e.g., a user may change the sizes of the user interfaces, information displayed in the user interfaces, color schemes used by the user interfaces, positions of text, images, icons, windows, or the like, in the user interfaces, or the like), and/or may not be user-configurable. Information associated with the user interfaces may be selected and/or manipulated by a user (e.g., via a touch screen display, a mouse, a keyboard, a keypad, voice commands, or the like). In some implementations, information provided by the user interfaces may include textual information and/or an audible form of the textual information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, fading channel conditions to utilize for simulating behavior of a plurality of mobile devices in a mobile network,
   at least one of the fading channel conditions for at least one of the plurality of mobile devices being different than at least another one of the fading channel conditions for at least another one of the plurality of mobile devices;
   generating, by the device, channel realizations based on the fading channel conditions,
   the channel realizations including time-discrete and frequency-discrete random channel coefficients;
   generating, by the device, a test channel based on the generated channel realizations; and
   providing, by the device, the test channel to a receiver device of the mobile network,
   the test channel causing the receiver device to perform functions associated with processing an actual channel.

2. The method of claim 1, where the receiver device generates feedback information based on the test channel, and the method comprises:
   receiving the feedback information from the receiver device; and
   providing the feedback information for display.

3. The method of claim 1, where the fading channel conditions are based on a wide-sense stationary and uncorrelated scattering (WSSUS) radio channel model.

4. The method of claim 1, where generating the channel realizations comprises:
   determining a matrix of independent and identically distributed complex, normal random variates;
   determining factors for covariance matrices associated with a frequency correlation function and a time correlation function; and
   generating the channel realizations based on the matrix and the factors.

5. The method of claim 1, where generating the test channel comprises:
   determining modulation symbols that are mapped to subcarriers;
   determining interference caused by neighbor mobile networks to the mobile network; and
   generating the test channel based on the channel realizations, the modulation symbols, and the interference.

6. The method of claim 5, where generating the test channel comprises:
   multiplying the modulation symbols and the channel realizations to generate a result; and
   adding the interference and the result to generate the test channel.

7. The method of claim 1, where the receiver device comprises an eNodeB associated with a long term evolution (LTE) network.

8. A device, comprising:
   a memory; and
   one or more processors to:
   receive, from the memory, fading channel conditions to utilize for simulating behavior of a plurality of mobile devices in a mobile network,
   at least one of the fading channel conditions for at least one of the plurality of mobile devices being different than at least another one of the fading channel conditions for at least another one of the plurality of mobile devices;
   generate channel realizations based on the fading channel conditions,
   the channel realizations including frequency-correlated, random channel coefficients;
   generate a test channel based on the generated channel realizations; and
   provide the test channel to a receiver device of the mobile network,
   the test channel causing the receiver device to process the test channel in a same manner the receiver device would process an actual channel.

9. The device of claim 8, where the one or more processors are to:
   receive feedback information from the receiver device based on the test channel; and
   provide the feedback information for display.

10. The device of claim 8, where the fading channel conditions are based on a wide-sense stationary and uncorrelated scattering (WSSUS) radio channel model.

11. The device of claim 8, where, when generating the channel realizations, the one or more processors are to:
    determine a matrix of independent and identically distributed complex, normal random variates;
    determine factors for covariance matrices associated with a frequency correlation function and a time correlation function; and
    generate the channel realizations based on the matrix and the factors.

12. The device of claim 8, where, when generating the test channel, the one or more processors are to:
    receive modulation symbols from the memory;
    generate interference information associated with neighbor mobile networks of the mobile network; and
    generate the test channel based on the channel realizations, the modulation symbols, and the interference information.

13. The device of claim 12, where, when generating the test channel, the one or more processors are to:
    multiply the modulation symbols and the channel realizations to generate a result; and
    add the interference information and the result to generate the test channel.

14. The device of claim 8, where the plurality of mobile devices includes two or more mobile devices.

15. A device, comprising:
    a buffer memory to store fading channel conditions associated with a mobile network;
    a channel emulator engine, at least partially implemented in hardware, to:
    receive selections of particular fading channel conditions to utilize for simulating behavior a plurality of mobile devices in the mobile network,
    at least one of the particular fading channel conditions for at least one of the plurality of mobile devices being different than at least another one of the particular fading channel conditions for at least another one of the plurality of mobile devices,
    retrieve the particular fading channel conditions from the buffer memory, and
    generate channel realizations based on the particular fading channel conditions,
    the channel realizations including frequency-correlated, random channel coefficients;
    a multiplier component and an adder component to:

receive the channel realizations from the channel emulator engine, and generate a test channel based on the channel realizations; and an inverse fast Fourier transform component, at least partially implemented in hardware, to:

receive the test channel from the adder component, and provide the test channel to a receiver device of the mobile network, the test channel causing the receiver device to perform functions associated with processing an actual channel.

16. The device of claim 15, where, when providing the test channel, the inverse fast Fourier transform component is to:

convert the test channel from a frequency domain to a time domain; and provide the converted test channel to the receiver device.

17. The device of claim 15, where, when generating the channel realizations, the channel emulator engine is to:

determine a matrix of independent and identically distributed complex, normal random variates;

determine factors for covariance matrices associated with a frequency correlation function and a time correlation function; and generate the channel realizations based on the matrix and the factors.

18. The device of claim 15, where, when generating the test channel, the multiplier component is to:

receive modulation symbols, receive the channel realizations from the channel emulator engine, and multiply the modulation symbols and the channel realizations to generate a result; and the adder component is to:

receive interference information associated with neighbor mobile networks of the mobile network, receive the result from the multiplier component, and add the interference information and the result to generate the test channel.

19. The device of claim 15, where the fading channel conditions are based on a wide-sense stationary and uncorrelated scattering (WSSUS) radio channel model.

20. The device of claim 15, where the plurality of mobile devices includes more than one-hundred mobile devices.

* * * * *